US005793125A

United States Patent [19]

Tarng

[11] Patent Number: 5,793,125
[45] Date of Patent: Aug. 11, 1998

[54] SMART INTEGRATED SOCKET AUTOMATION SYSTEM

[76] Inventor: Min Ming Tarng, 1367 Glenmoor Way, San Jose, Calif. 95129

[21] Appl. No.: 81,074

[22] Filed: Jun. 22, 1993

Related U.S. Application Data

[63] Continuation-in-part of Ser. No. 660,019, Feb. 25, 1991, abandoned.

[51] Int. Cl.$^6$ ................................ H01H 35/00
[52] U.S. Cl. ........................ 307/117; 307/326; 361/170
[58] Field of Search ............................ 361/170, 179, 361/182, 189, 190; 307/117, 326, 140; 340/573, 554, 555; 348/552

[56] References Cited

U.S. PATENT DOCUMENTS

| | | | |
|---|---|---|---|
| 4,321,593 | 3/1982 | Ho et al. | 340/541 |
| 4,348,696 | 9/1982 | Beier | 358/188 |
| 4,357,602 | 11/1982 | Lemelson | 340/539 |
| 4,512,000 | 4/1985 | Masuko | 367/93 |
| 4,641,191 | 2/1987 | Sutton | 358/168 |
| 4,668,876 | 5/1987 | Skarman | 307/116 |
| 4,716,469 | 12/1987 | Kim et al. | 358/245 |
| 4,755,691 | 7/1988 | Bethea | 307/114 |
| 4,773,155 | 9/1988 | Buchien | 29/622 |
| 4,779,240 | 10/1988 | Dorr | 367/96 |
| 4,831,448 | 5/1989 | Park | 358/188 |
| 4,835,614 | 5/1989 | Ryu | 358/188 X |

*Primary Examiner*—Fritz Fleming

[57] ABSTRACT

The add-on smart socket adaptor integrates electric facilities and/or home appliances to be an intelligent system for the home automation. The add-on smart socket adaptor has the add-on multiple different sensors to detect the complex environmental changes as the inputs of the programmed logic to make the complex decision function to generate the output to turn on and/or turn off the multiple different home appliances and electrical facilities smoothly, separately and cooperatively. The add-on smart socket also can be built-in to integrate with the home appliances and electrical facilities to have the home automation. The add-on smart socket adaptor provides the open platform and standard for the synthesis of home automation integrated system.

27 Claims, 19 Drawing Sheets

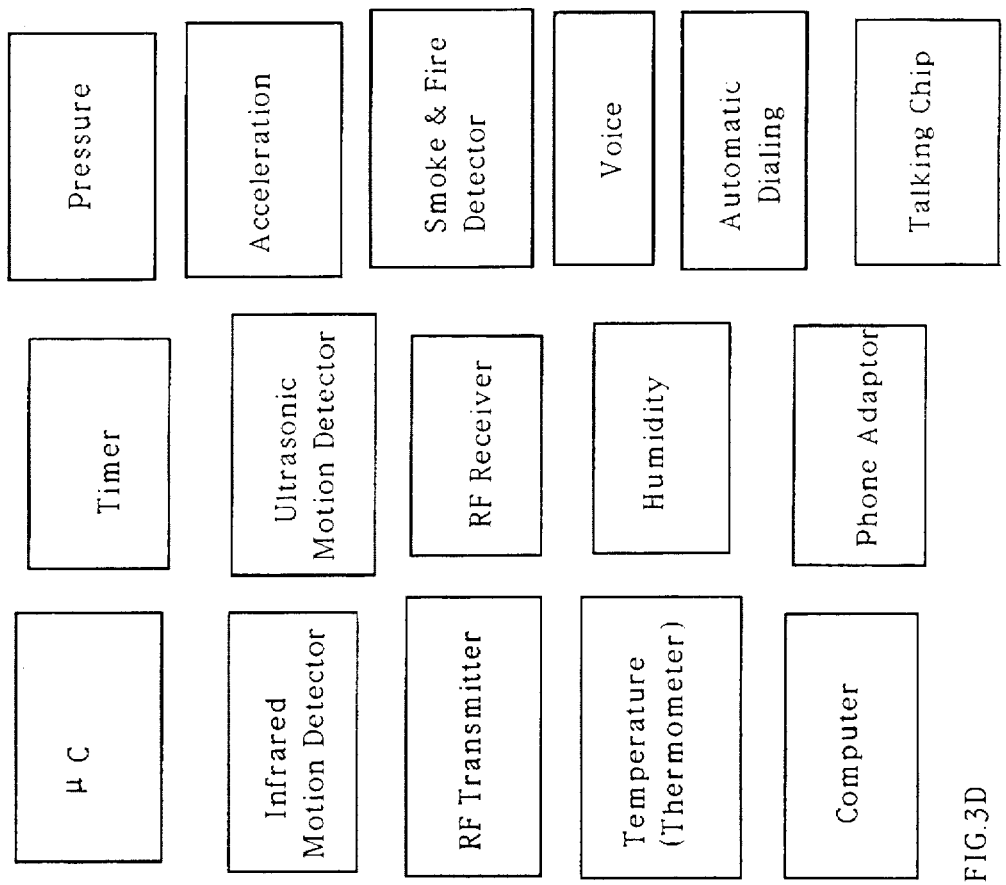
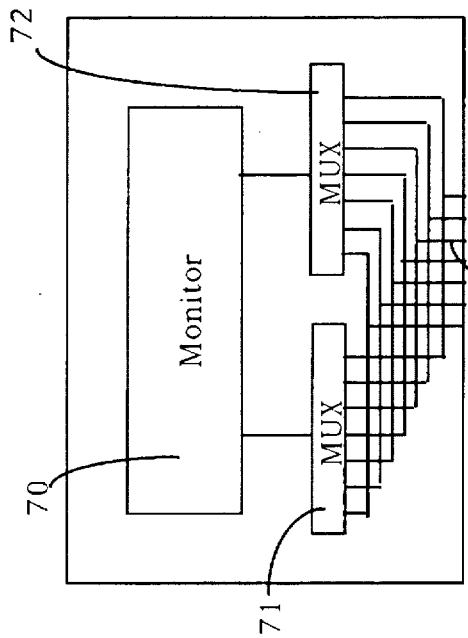
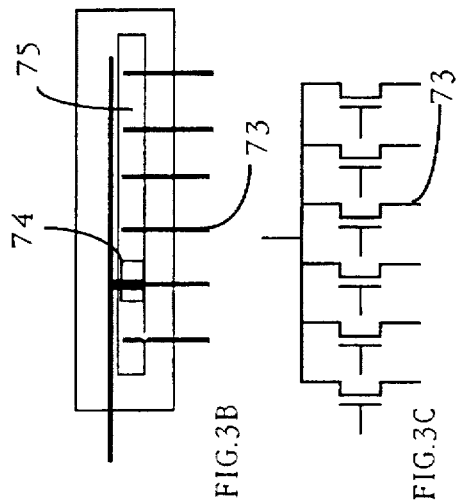

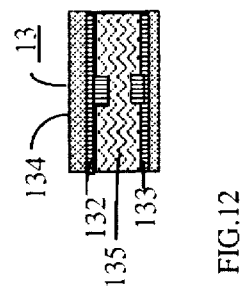
FIG.12
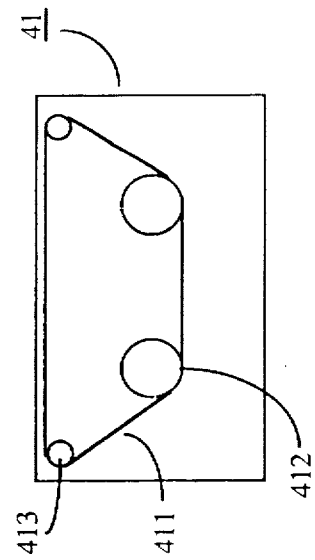
FIG. 13
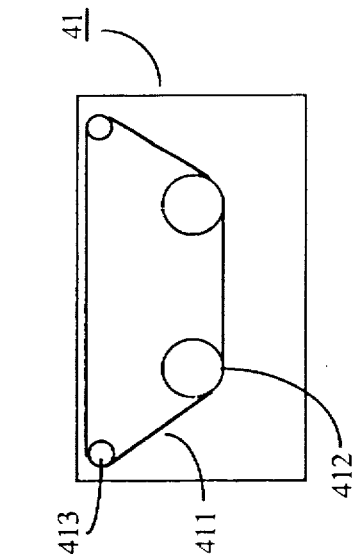
FIG. 9
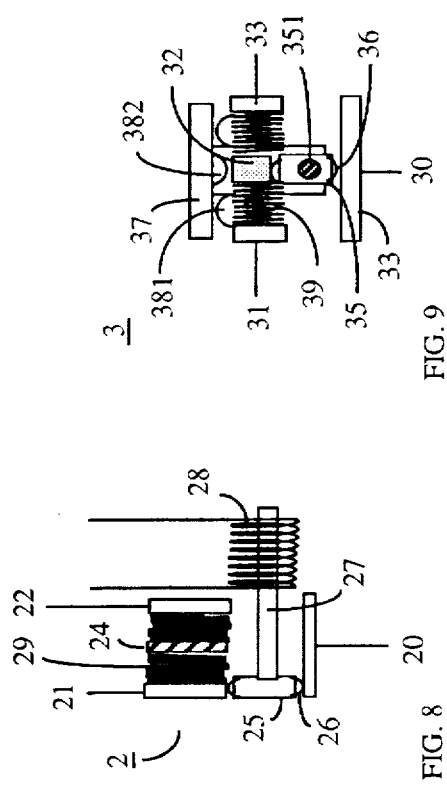
FIG. 8
FIG. 11
FIG. 10

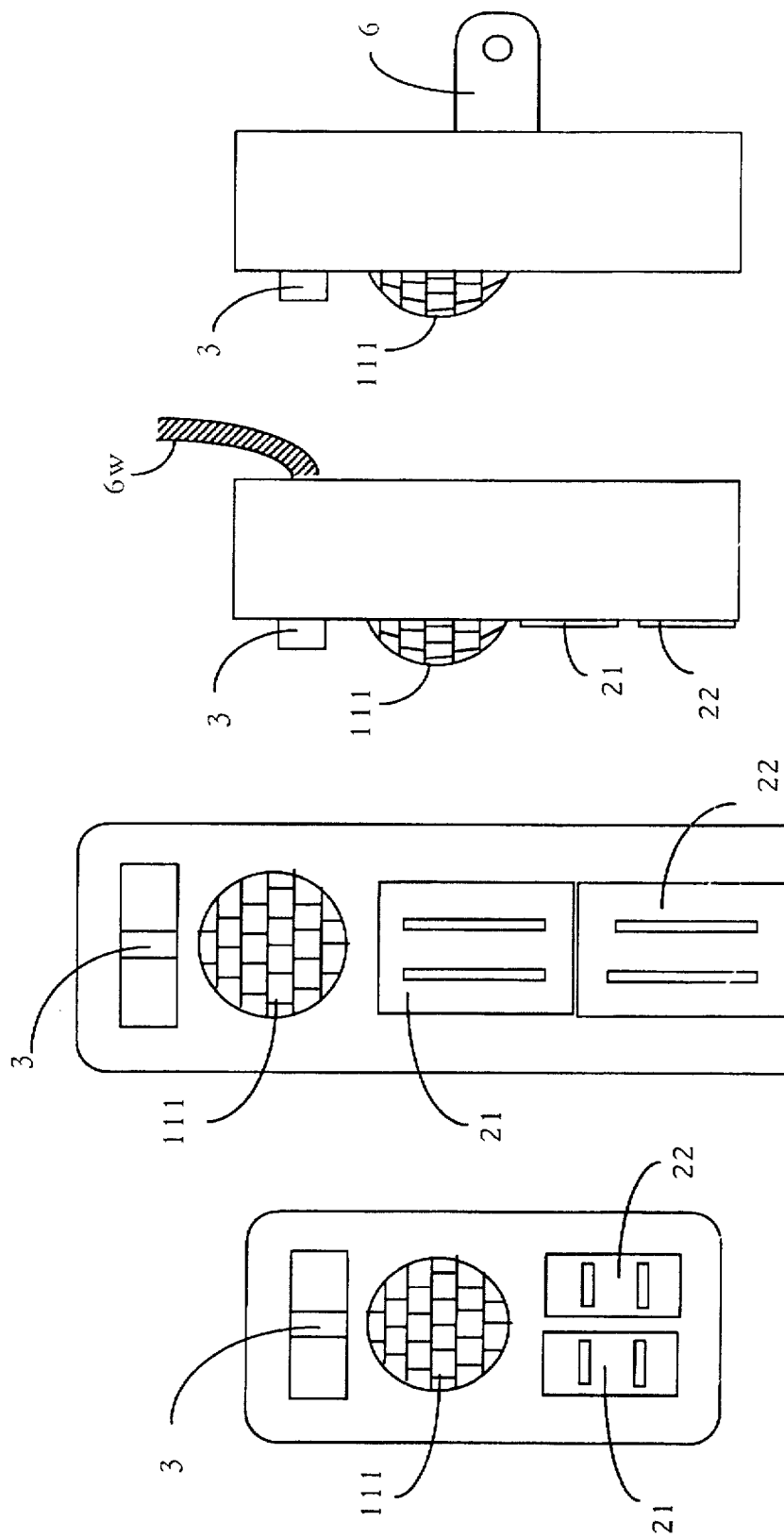

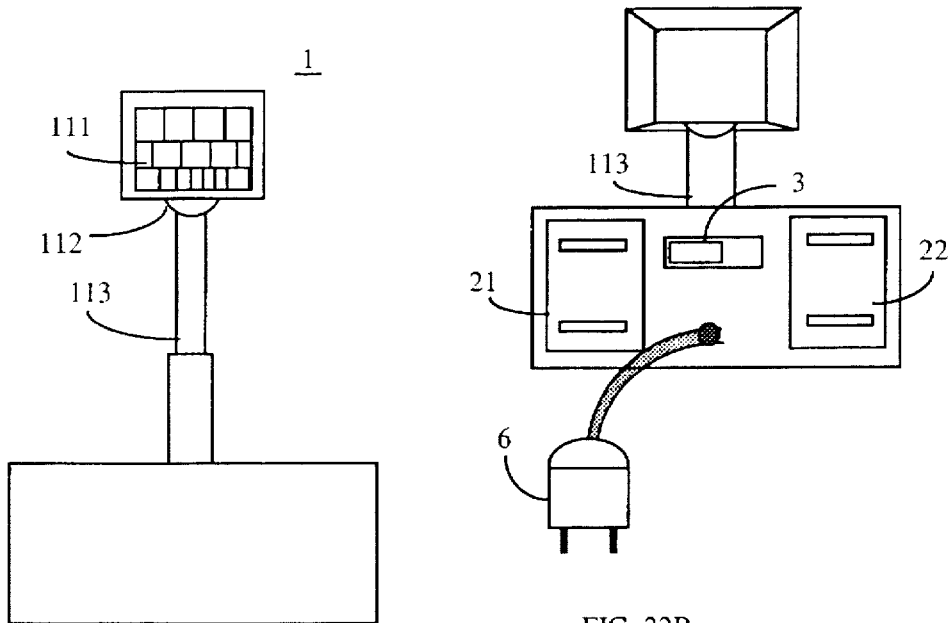
FIG. 22A
FIG. 22B
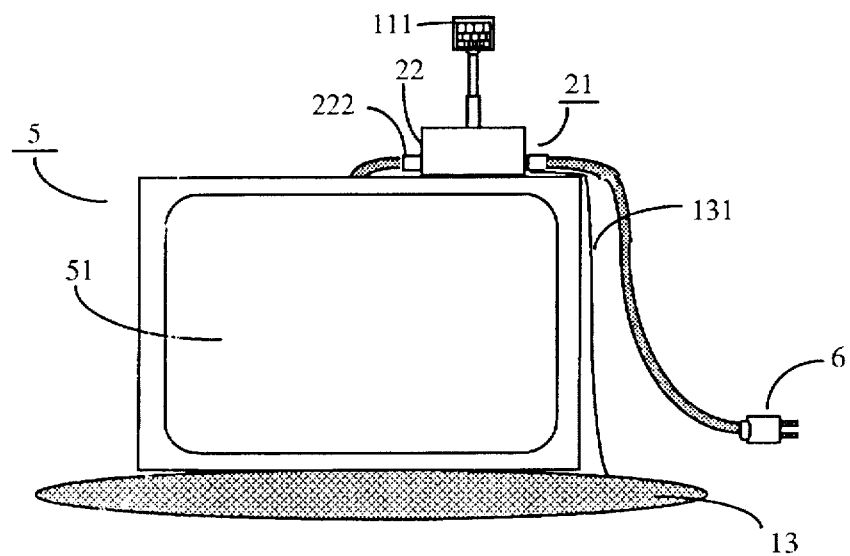
FIG. 22C

5,793,125

1

SMART INTEGRATED SOCKET AUTOMATION SYSTEM

This is a continuation-in-part of Ser. No. 07/660,019, filed Feb. 25, 1991, now abandoned.

BACKGROUND

1. Field of Invention

This invention relates to the automation synthesis open system with add-on smart socket adaptor integrating electric facilities to be an intelligent system.

2. Description of Prior Art

In the automation era, the home electric facilities are first needed to be modernized. The automation needs the monitoring devices to integrate the electric facilities to be an intelligent system. However, it costs too much money to replace the existing electric facilities. Even worse, the different customers have different requirements of automation in different working enviroments. Some requirements even occur accidently in the field. The customers' requirements are unpredictable beforehand. The customers need the imaginations to solve the field problems. The application specific build-in monitoring device has only one single function that it cannot meet with the different needs of the different customers. Furthermore, it might induce annoyance and bothering to the normal operation. Not all the customers need the function. It causes the bulid-in monitoring system fails in to succeed in the market.

For example, the U.S. Pat. No. 4,321,593 issued to Ho illustrated a TV having the build-in view range monitoring device. For the most customers, there is no need for this function. They will not be willing to pay for it. For the family having kids staying close to TV screen, however, the parent might want this function only for a short period. But no parent wants to buy another TV having the monitoring function. The add-on smart socket adaptor solves this problem. Just plugging the plug of conventional TV in the smart socket adaptor, the TV becomes an intelligent TV. Furthermore, to minimize the cost or have versitile functions, the add-on card for the smart socket adaptor may be changed. For example, the parent may want to control the kids' view time of TV. To have the time-monitoring function, the monitoring card may be replaced with the timing card or interface card of microcomputer. Using the microcomputer interface card to interface with the personel computer(PC), it saves a lot of money and has the practical usage of the personel computer. The U.S. Pat. No. 4,348,596 issued to Beier has to have the dedicated complicate microcontroller system. No parent is willing to buy such a microcontroller dedicated to monitor the view time of TV.

Furthermore, with my smarter socket adaptor, the intelligent system even provides much better compound service. With my add-on cards and smart socket adaptor, all the different customer's automation requirement may be synthesized easily. For example, with the infrared motion monitoring card, time monitoring card and temperature monitoring card cooperating in the open system of my smart socket adaptor, the baby will sit outside the safety viewing distance. The monitoring card and timing card or PC can work together to enable the common TV to have both the timing function and the viewing distance monitoring function. As the sleeping time coming, the TV will be shut-off automatically. As the kids leave the living room, the heater will automatically shut-off. All the wanted functions can be synthesized with the smart socket adaptor having the different add-on cards.

2

For Ho's patent to work with Beier's patent, they costs a lot. The customer needs to buy the special TV with the build-in monitoring device and the dedicated microcontroller having the timing function. Even worse, their facilities cannot be used to adapt to the other different requirements. It would be very nice to have a monitoring device to keep the temperature in living room to be warm during the time when kids are watching television.

Furthermore, the add-on smart socket adaptor can interface with the PC. it will generate the new requirements for the new family-oriented automation synthesis softwares. It is the starting point for the practical usage of the PC for the household in the automation era.

OBJECTS AND ADVANTAGES

The automation synthesis open system with add-on smart socket adaptor can integrate the electrical facilities to be an intelligent system according to the customer's different requirements.

DRAWING FIGURES

FIG. 3 (A) is the structure of the add-on controller card; (B) is the schematic diagram of the multiplex implemented with mechanical sliding switch; (C) is the multiplex implemented with MOS devices; (D) is the different kind of add-on controller cards.

FIG. 8 is the bi-function dimmer relay used in the smart socket adaptor.

FIG. 9 is the tri-state dimmer switch.

FIG. 10 is the toggle type bi-function dimmer switch.

FIG. 11 is the toggle type tri-state dimmer switch.

FIG. 12 is the cross section of the mat switch.

FIG. 13 is the section view of the endless tape.

Figure 2A:
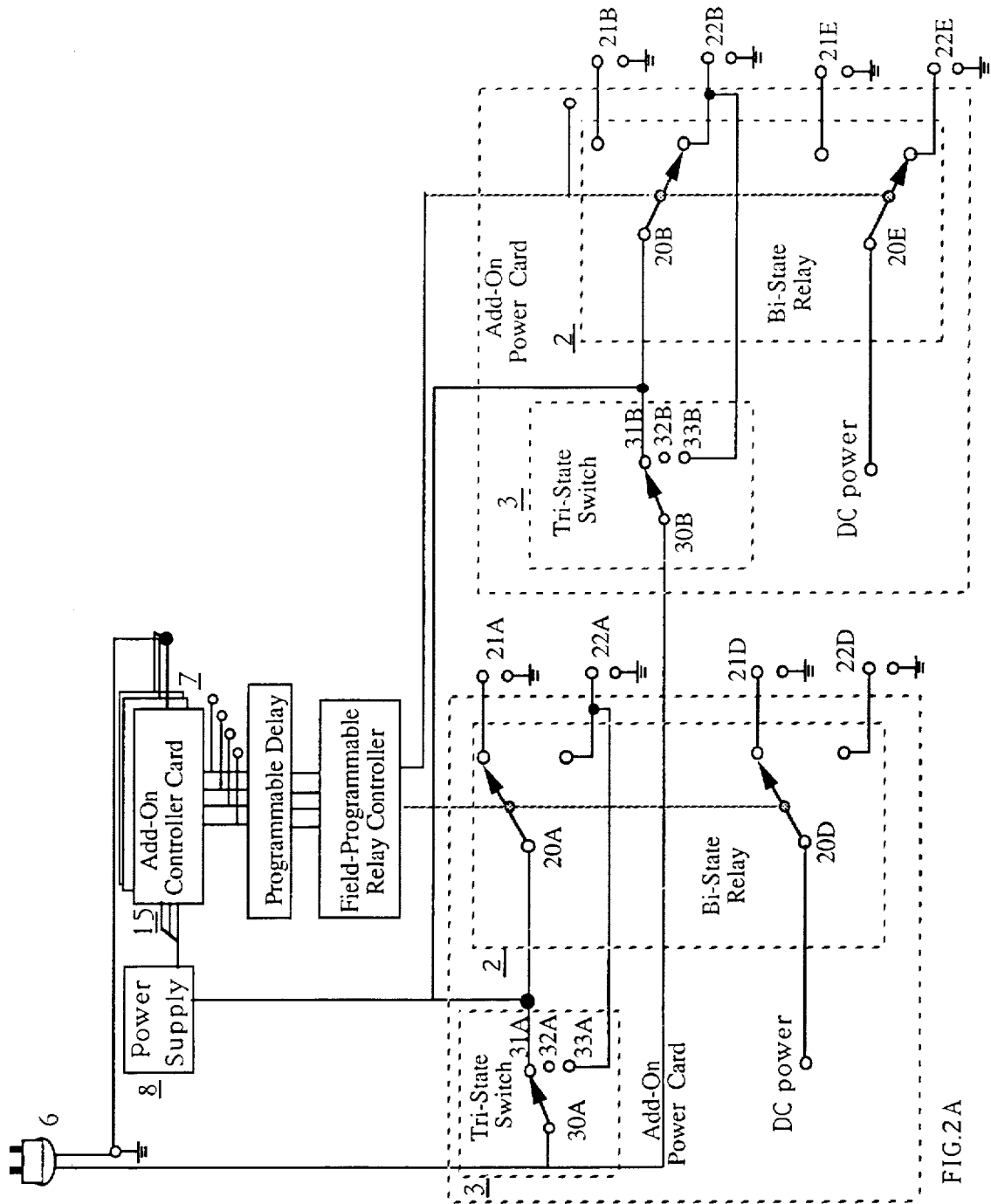
FIG. 2 (A) is the schematic diagram of the add-on smart socket adaptor having the general programmable array connection; (B) is the schematic diagram in FIG. 2A having the blocks been replaced with the modules as shown from FIG. 3 to FIG. 13.

FIG. 15 is the open system programmable smart socket adaptor integrating the commercial recorder and television to be an intelligent system; (A) the smart socket adaptor is in the by-pass mode; (B) the smart socket adaptor is in the power-on monitor mode; (C) the smart socket adaptor is in the power-off mode; (D) is the smart socket adaptor implemented with the schematic diagram as shown in FIG. 2A; the connections in FIG. 15A and FIG. B are marked with the thick lines in FIG. 15D.

FIG. 16 is the outside view of the smart socket adaptor; (A) is the single plug socket adaptor; (B) is the multiple plugs long slot socket adaptor.

FIG. 17 is the side view of the smart socket adaptor; (A) is the smart socket adaptor which can be built in the wall or connected with the extension wire; (B) is the smart socket adaptor having the plug inserted in the commercial socket adaptor.

Figure 18:
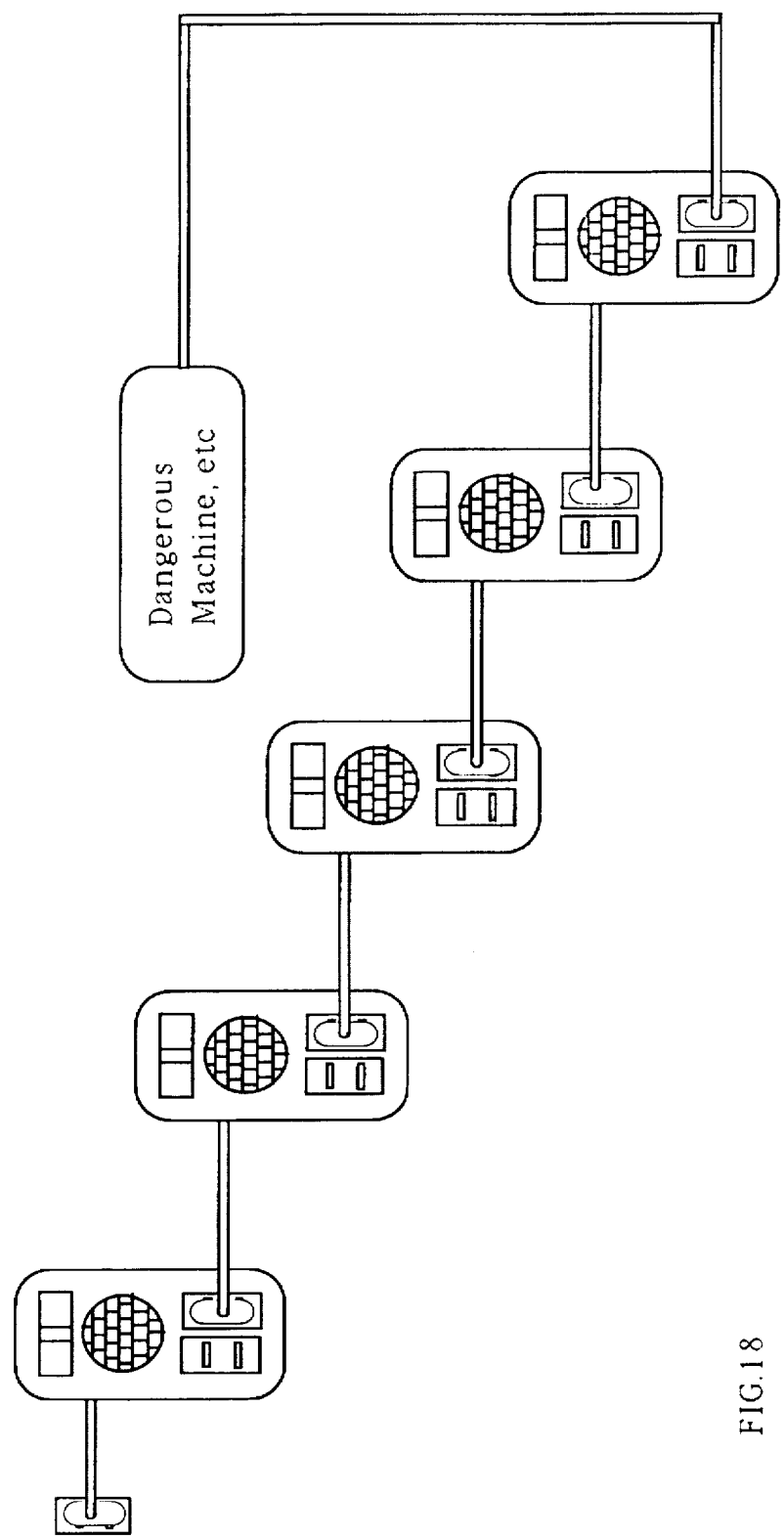

FIG. 18 is the series chain of the smart socket adaptors to protect the large electrical facility.

Figure 19:
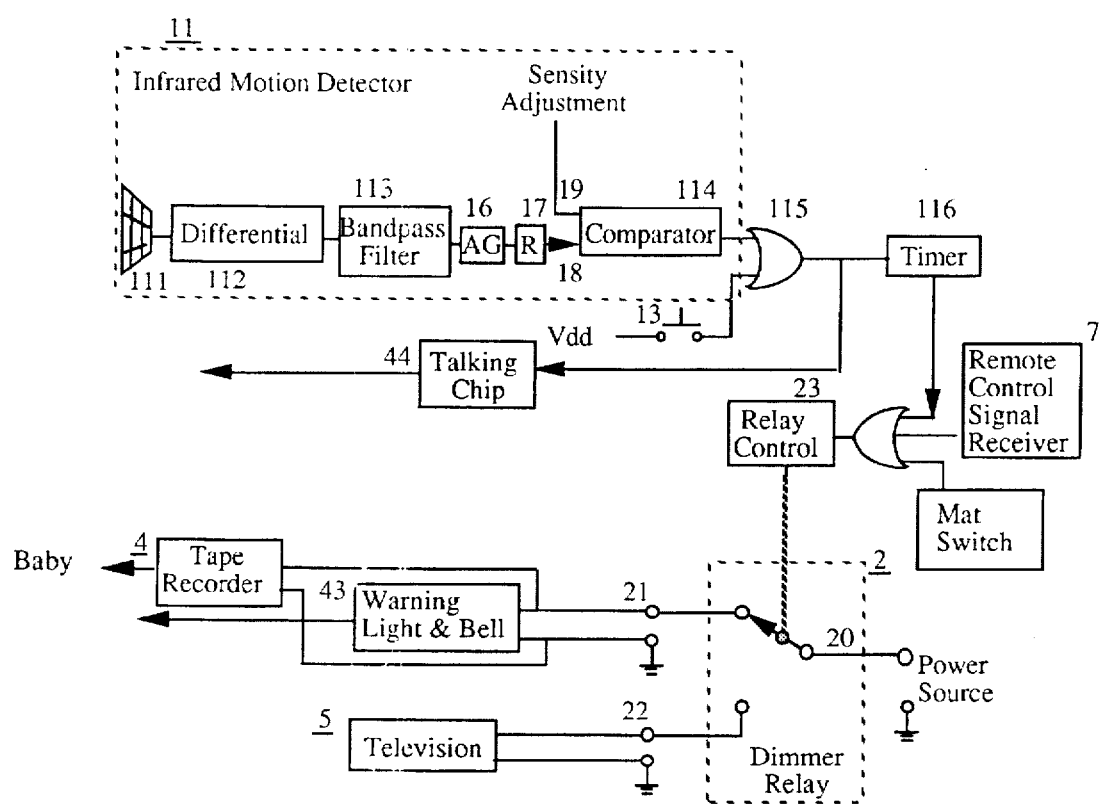

FIG. 19 is the smart socket adaptor with infrared motion detector to integrate the electrical facilities to be an intelligent system.

Figure 20:
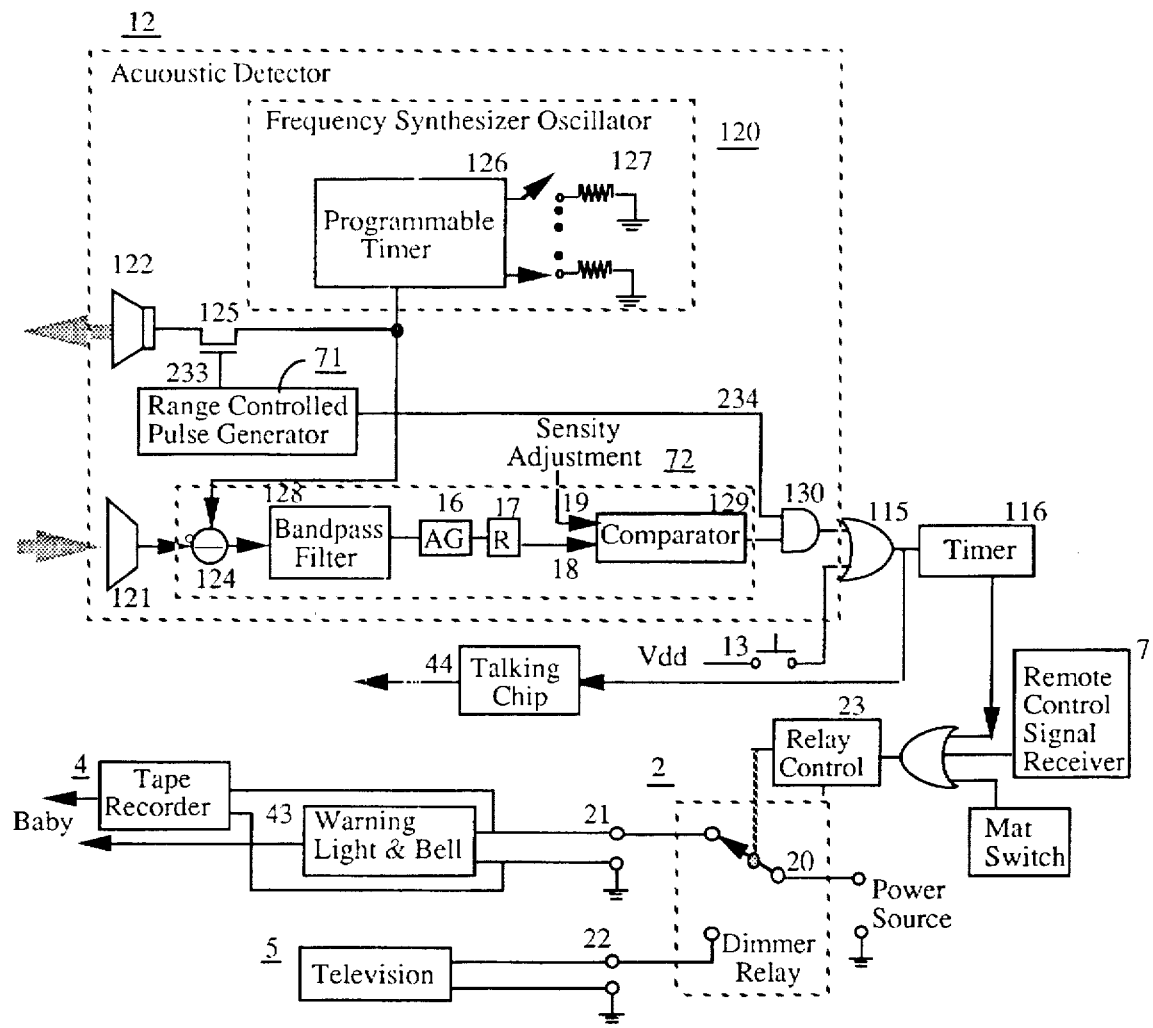

FIG. 20 is the smart socket adaptor with ultrasonic motion detector to integrate the electrical facilities to be an intelligent system.

Figure 21:
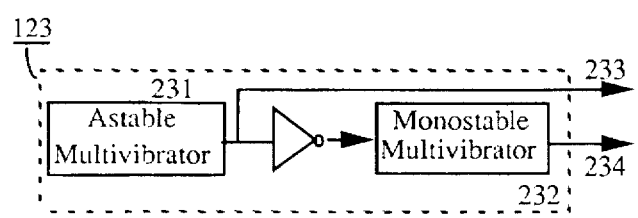

FIG. 21 is the block diagram of the range control pulse generator adopted in the ultrasonic motion detector.

FIG. 22 is the elevation view of the smart socket adaptor with infrared motion detector; (A) is the front view of the smart socket adaptor; (B) is the back view of the smart socket adaptor; (C) is the smart socket adaptor with infrared motion detector sitting on the top of a commercial television.

Figure 23:
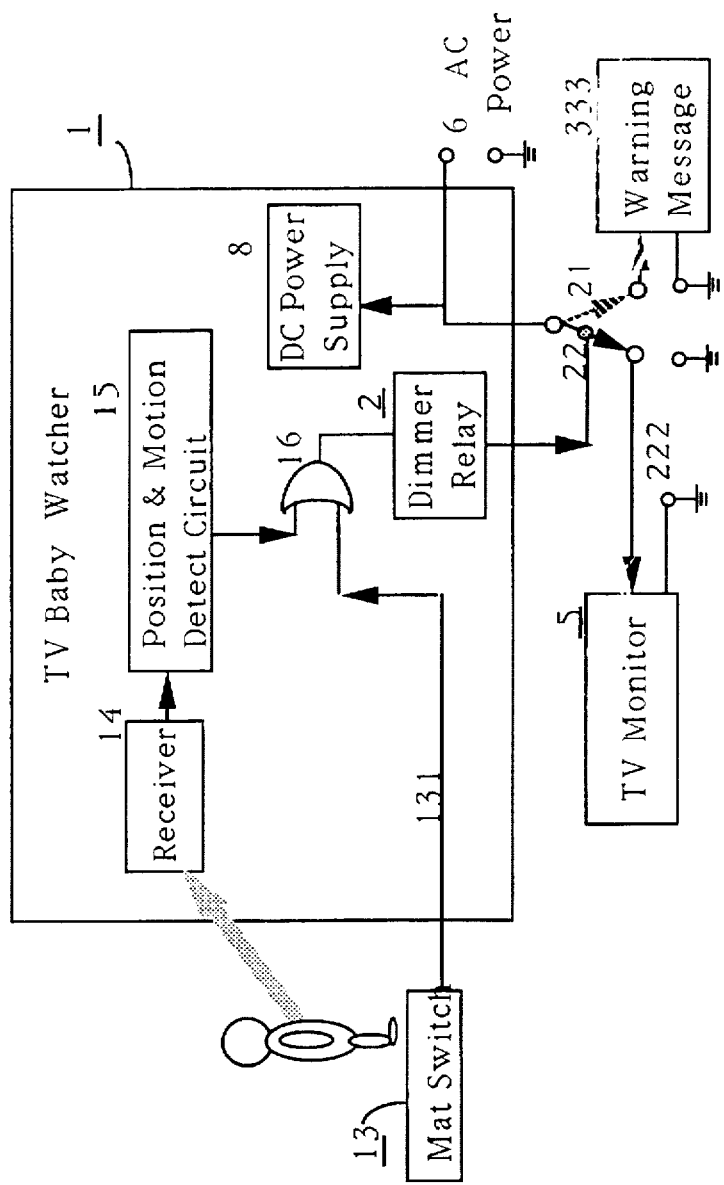

FIG. 23 is the schematic diagram of the smart socket adaptor with the infrared type motion detector and mate switch.

Figure 24:
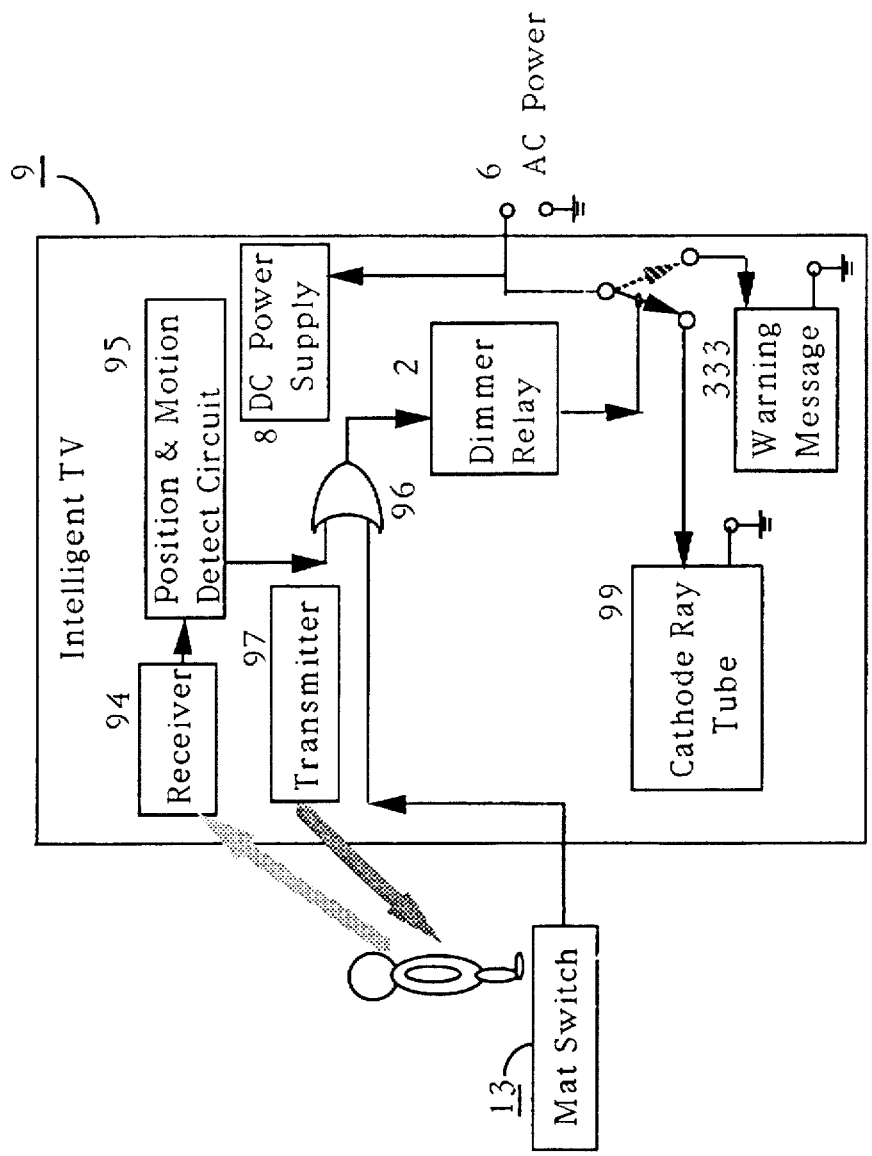

FIG. 24 is the schematic diagram of the smart socket adaptor with the ultrasonic type motion detector and mate switch with the build-in electrical devices.

DESCRIPTION OF THE PREFERRED EMBODIMENTS

In the automation era, for the home automation and household assistance, the open system smart socket adaptor is to integrate the electrical facilities with the smart sensors and/or personnel computer(PC) to be an intelligent system. The smart socket adaptor comprises the add-on controller cards, the add-on power cards, programmable delay card, programmable logic and bus connections. There are several different implementations of the smart socket adaptors. The components of input multiplex, output multiplex, input switch box and output switch box may be implemented with either mechanical switch or electronic switch. The good for mechanical switch is that it can be set with manual switch; the good for the electronical switch is that it can be set with personnel computer, etc. In the following discussion, we use the general schematics to illustrate the key idea. It can be implemented with either the VLSI circuit or mechanical switch.

Figure 1:
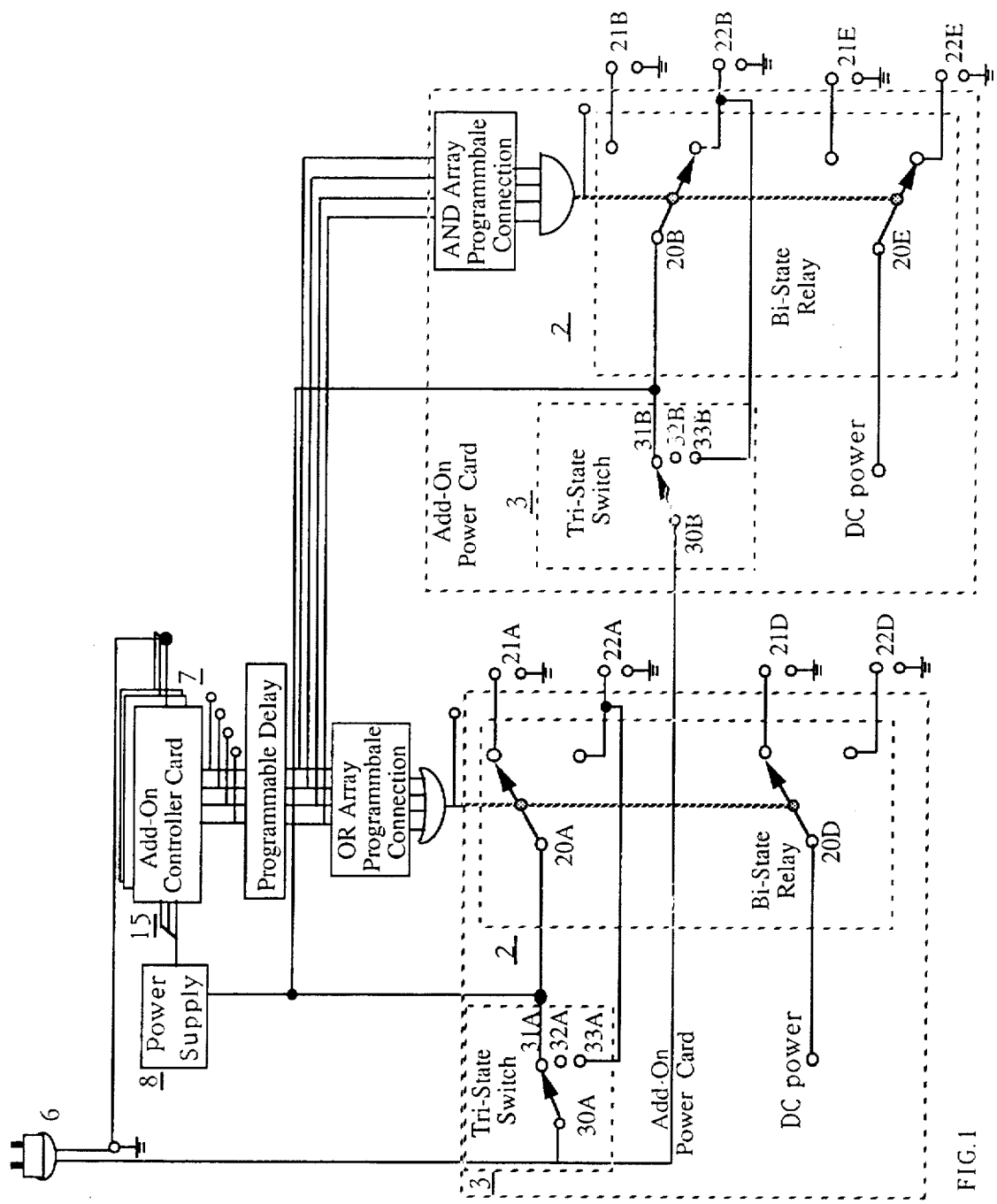
FIG. 1 is the schematic diagram of the add-on smart socket adaptor having the simple OR and AND programmable arrays.

FIG. 1 is the first version of the smart socket adaptor. The programmable logic and connections are implemented with the OR array programmable array connection and/or AND programmable array connection. The add-on controller cards comprise many add-on cards having the different functions. Some functions of the add-on cards as shown in FIG. 3D. The add-on card can be the microcontroller, infrared motion detector, timer, pressure sensor, acceleration detector, smoke and fire detector, ultrasonic motion detector, radio frequency(RF) transmitter, RF receiver, temperature sensor, humidity sensor, voice, automatic dialing for the phone, computer, phone adaptor and talking chip, etc. The add-on card has the general structure of the monitor, input multiplex, output multiplex and the signal bus as shown in FIG. 3A. The signal bus structure enables the microcontroller and personnel computer can interface with all the other add-on-card detectors. FIG. 3B is the multiplex implemented with mechanical switch; FIG. 3C is the multiplex implemented with the electronic switch of MOS devices.

Figure 7C:
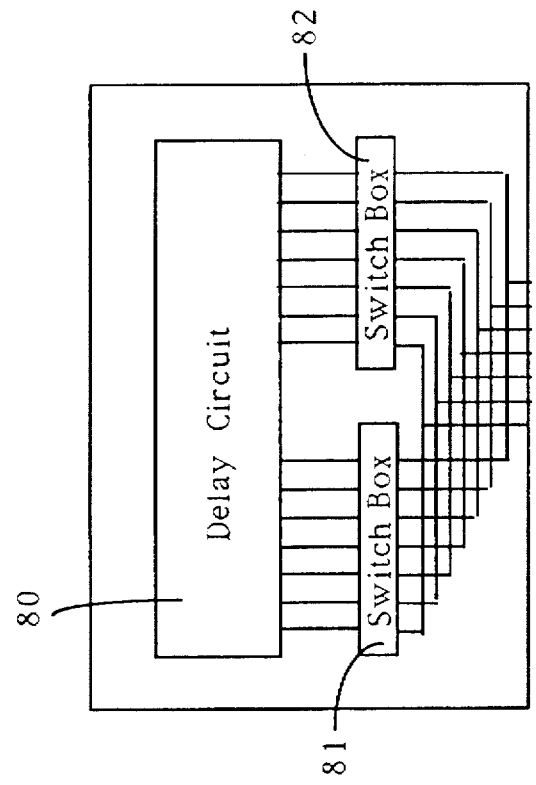
FIG. 7 (A) is the programmable delay circuit; (B) is the schematic diagram of the switch box; (C) is schematic diagram of the add-on delay card.
Figure 7A:
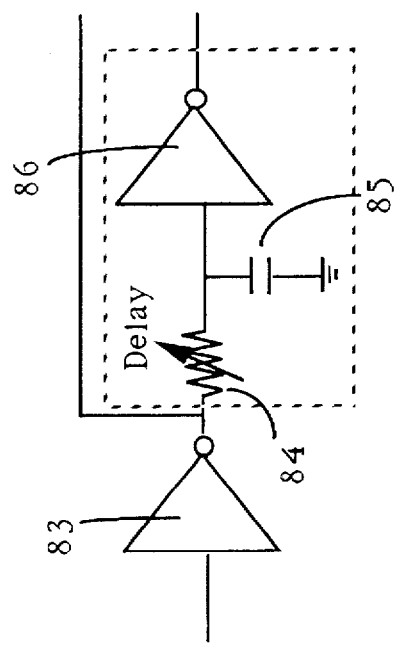
Figure 7B:
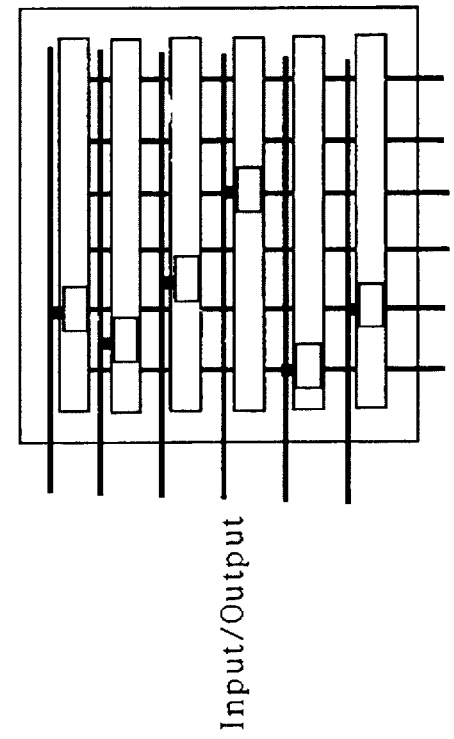

The add-on delay card adds delay to the signal for a specified short period. As shown in FIG. 7C, the delay card is constituted of the delay circuit 80, input multiplex 81 and output multiplex 82. The delay circuit is shown as FIG. 7A. Adjusting the resistance of resistor 84, the delay time may be adjusted. The input switch box or output switch box is shown as FIG. 7B. For the manual setting switch, sliding the sliding contacts, the inputs or outputs will select the bus line to make the programmable connections. If a sliding contact doesn't make any contact, there is no connection for this input or output. For the PC setting-up switch, the electronic switchs may be implemented with the MOS transmission gates.

Figure 4A:
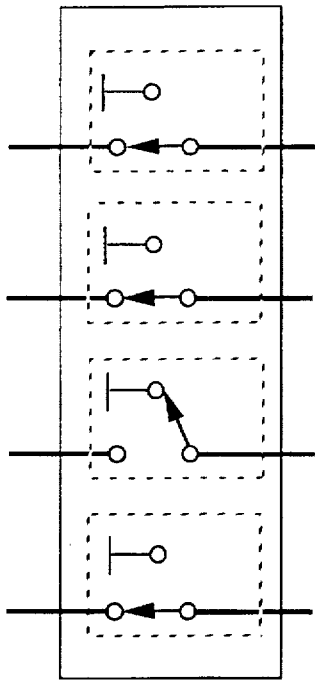
FIG. 4 (A) is the schematic diagram of the OR type array connection; (B) is the schematic diagram of the AND type array connection.
Figure 4B:
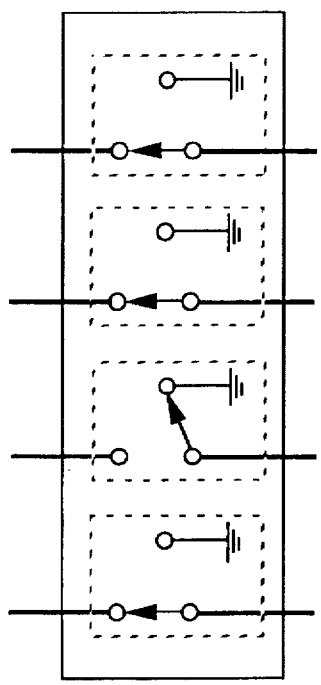

The add-on programmable control card is constituted of the programmable logic and programmable connection. The programmable logic and programmable connections can generate the versatile programmable combinatory decision functions. The OR programmable array can be implemented as shown in FIG. 4A. The activating signal makes the direct connection; the deactivated signal is connected to the ground. In this programmable array connection, the active signal generated by the controller card will activate the bi-state relay 2A for the AC power supply and/or the DC power supply. Similarly, the AND array connection is implemented as shown in FIG. 4B. The activating signal makes the direct connection; the deactivated signal has the connection connected to the power lead. In the AND array connection, unless all the directly connecting signals are activated, the bi-state switch 2B will not be activated.

The add-on power card is constituted of the tri-state switch and the bi-function relay. The bi-function relay 2 actually is a switch having a single throw with double leads. The tri-state switch 3A has the power-on monitor mode, power-off mode and by-pass mode. During the by-pass mode, the power is connected to the socket directly. The smart socket adaptor acts as a conventional socket adaptor. During the power-on mode, the output signal of the programmable logic will activate the bi-function switch. The AC power is cut-off or supplied to the socket 21B and 22B alternatively; the DC power is cut-off or supplied to the socket 21E and 22E alternatively.

Figure 2B:
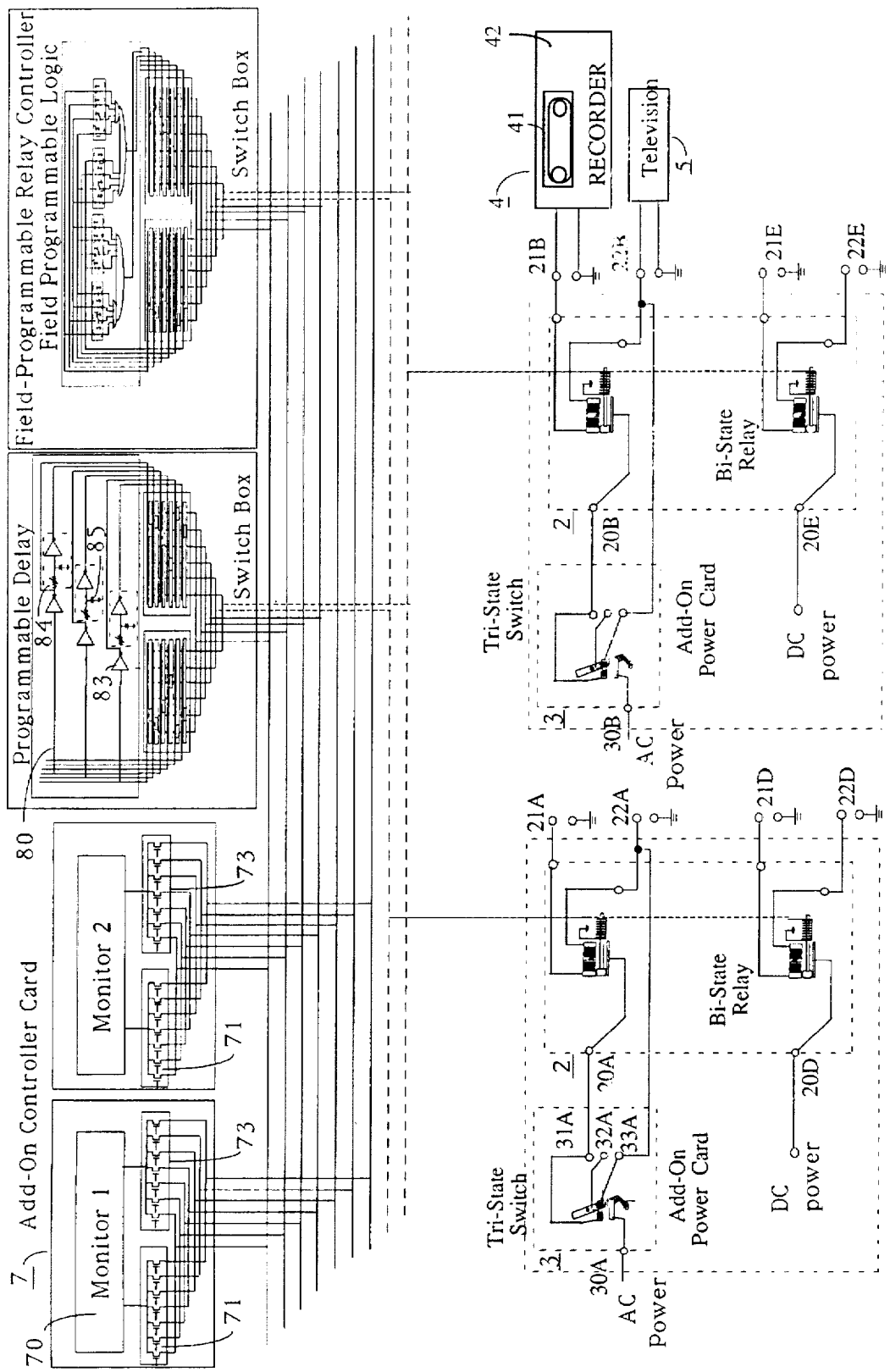
Figure 5A:
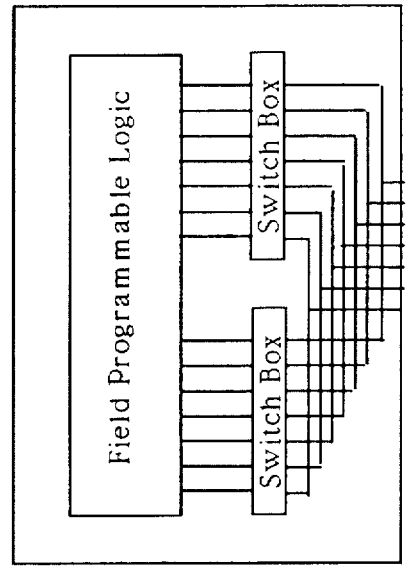
FIG. 5 (A) is the general structure of the field programmable relay controller; (B) is the schematic diagram of the add-on card for the field programmable controller card.
Figure 5B:
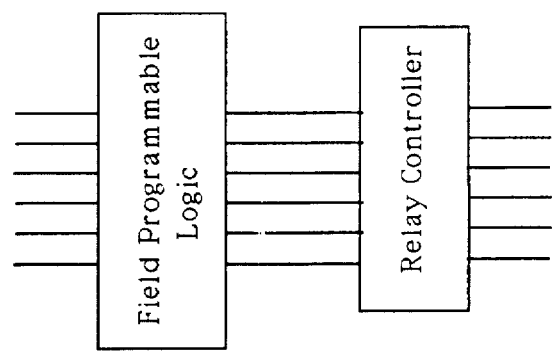

FIG. 2A shows the general structure of the smart socket adaptor. FIG. 2B adopts the modules as shown from FIG. 3 to FIG. 13 to implement the smart socket adaptor as shown in FIG. 2A. The blocks in FIG. 2A are replaced with the corresponding modules as shown from FIG. 3 to FIG. 13 to show the detailed implementations of the smart socket adaptor. The programmable driver uses the field programmable relay controller. As shown in FIG. 5A, the field programmable can be implemented with the combination of field programmable logic and relay controller. The field programmable relay controller can be implemented with VLSI chip. There are many chip technologies available for the programmable relay controller such as PLA, PAL, FPGA, etc. The field programmable relay controller can be implemented with the add-on card as shown in FIG. 5B. All the add-on cards share the same bus lines. With the selection of the input switch box and output switch box, all the connections and logic functions can be implemented per customer's request.

Figure 6B:
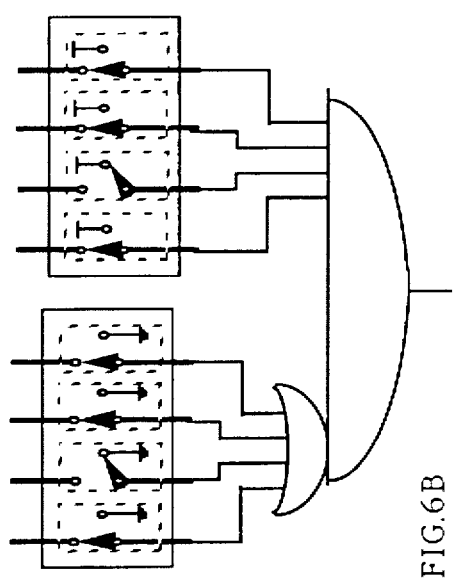
FIG. 6 (A) is the field programmable relay controller having the AND or OR logic function; (B) is the field programmable relay controller having the AND-OR logic function; (C) is the field programmable relay controller having the OR-AND logic function.
Figure 6C:
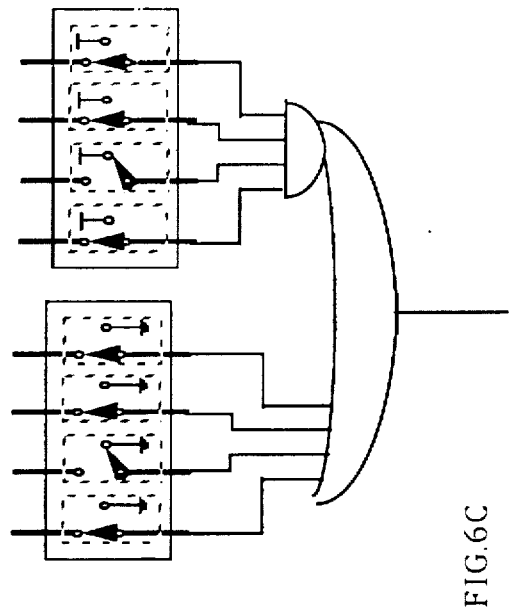
Figure 6A:
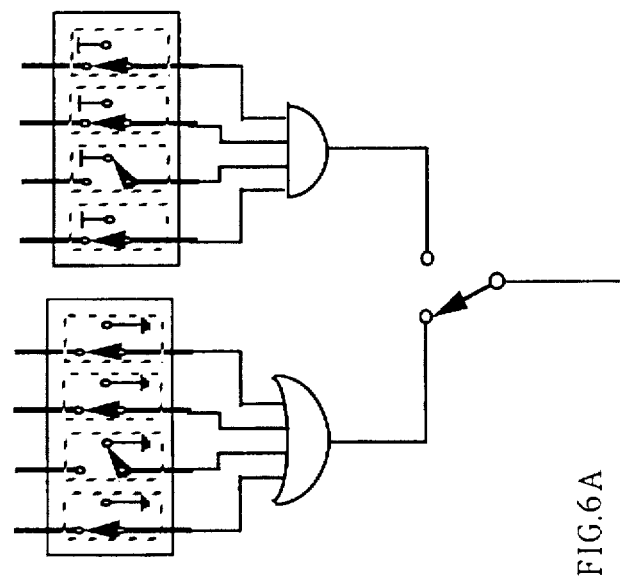

However, to make the trade-off among the logic flexibility, custommer's investment and the requirement of knowledge, the compromissary solutions are proposed in FIG. 6. As shown in FIG. 6A, the programmable relay controller has both the AND logic and OR logic. Both the AND array programmable connection and the OR array programmable connection in FIG. 1 can be replaced with the programmable logic relay controller as shown in FIG. 6A. The other simple logic programmable controllers are shown in FIG. 6B and FIG. 6C. FIG. 6B is the programmable AND-OR logic gate; FIG. 6C is the programmable OR-AND logic gate. The programmable AND-OR gate or programmable OR-AND gate can replace the programmable connections and logic gate in FIG. 1.

Since the smart socket adaptor turns on and off the electrical facilities pretty often, to increase the life of electric products, the relay of smart socket adaptor 1 adopts the dimmer switches. The dimmer mechanism is adopted to protect the electrical products from the large amount current at the moment of turning off. As shown in FIG. 8, the bi-function dimmer relay switch 2 comprises the conducting poles 21, 22 and 20, the isolating block 24, the resistors 29, the sliding plug 25, the contact leaf springs 26, the sliding magnetic pole 27 and the coil 28. Changing the current direction in the coil 28, the sliding plug 25 slides left and right. As the plug 25 slides to the right, the leaf springs 26 contact with the variable resistors 29. The resistance increases, the current reduces and the voltage across electrical facilities, too. As the plug 25 slides over the isolating block 24, the plug 25 has no contact with the resistor 29 and the current is completely shut off. As the plug 25 slides to the right, the pole 20 is connected to the other pole 22. With the bi-function dimmer relay 2, the voltage and current is tiny as the switch is shut off. There is no spark jumping through the gap. The load is protected with the bi-function dimmer relay 2.

As shown in FIG. 9, the tri-state dimmer switch 3 is made of the same principle. The tri-state switch 3 comprises the conducting poles 31 and 33, the variable resistors 39, the nonconductive block 32, the sliding plug 35, the contact leaf springs 36, the swivel pin 351, the spring retainers 381 and 382. As the switch bar 37 slides, the recoil springs 381 and 382 are compressed to distort first and then expand to push the sliding switch bar 37 to another stable position to have the toggle action. The switch bar 37 drags the pin 351 and the plug 35 to slide. The sliding plug 35 slides between the conducting poles 31, 33 and the isolated block 32. With the variable resistors 39, the current and voltage across the load is reduced slowly. The electrical facilities may be turned on and off repeatedly without hurting the electrical facilities.

As shown in FIG. 10, the on-off bi-function toggle dimmer switch comprises the conducting poles 61 and 63, the variable resistor 62, the nonconductive block 64, the sliding plug 65 and pin 65a, the contact leaf springs 66, the toggle bar 67, the pin 67a, the sliding slot 67b, the spring retainer 67c, the toggle spring 69 and the spring end holder 68. As the toggle bar 67 swings, the toggle spring 69 is compressed first then expands to push the toggle bar to another extreme point to have the toggle action. The sliding plug slides between the conducting pole 61 and the isolated block 64. With the variable resistance 62, the current and voltage across the load is reduced slowly. The load is protected that the television may be turned on and off repeatedly without hurting the television.

The bi-function dimmer switch in FIG. 11 is the same as the dimmer switch in FIG. 10 except that the on-off mode changing to be bi-function mode. The nonconductive block 64 separates the variable resistors 621 and 622.

To illustrate the open system of the smart socket adaptor, the mat switch is used. The cross section of mat switch is shown as FIG. 12. The positive power supply is connected to the pole 133; the wire 131 is connected to the pole 132. The plastic isolation 134 wraps around the poles 132 ,133 and the foam 135. As the man steps on the mat switch 13, the foam 135 is compressed. The pole 132 contacts with the pole 133. The "on" signal is sent through wire 131 to the OR gate 16.

To integrate the electrical facilities to be an intelligent system, there are some specially designed facilities. For example, the warning message may be issued with a tape recorder. The tape needs to repeat the warning message. FIG. 13 shows the endless tape 41. The tape 411 is in the loop shape. It is wraped on the pole 413 and the hub 412. It is adaptable to the conventional tape recorder.

Figure 14:
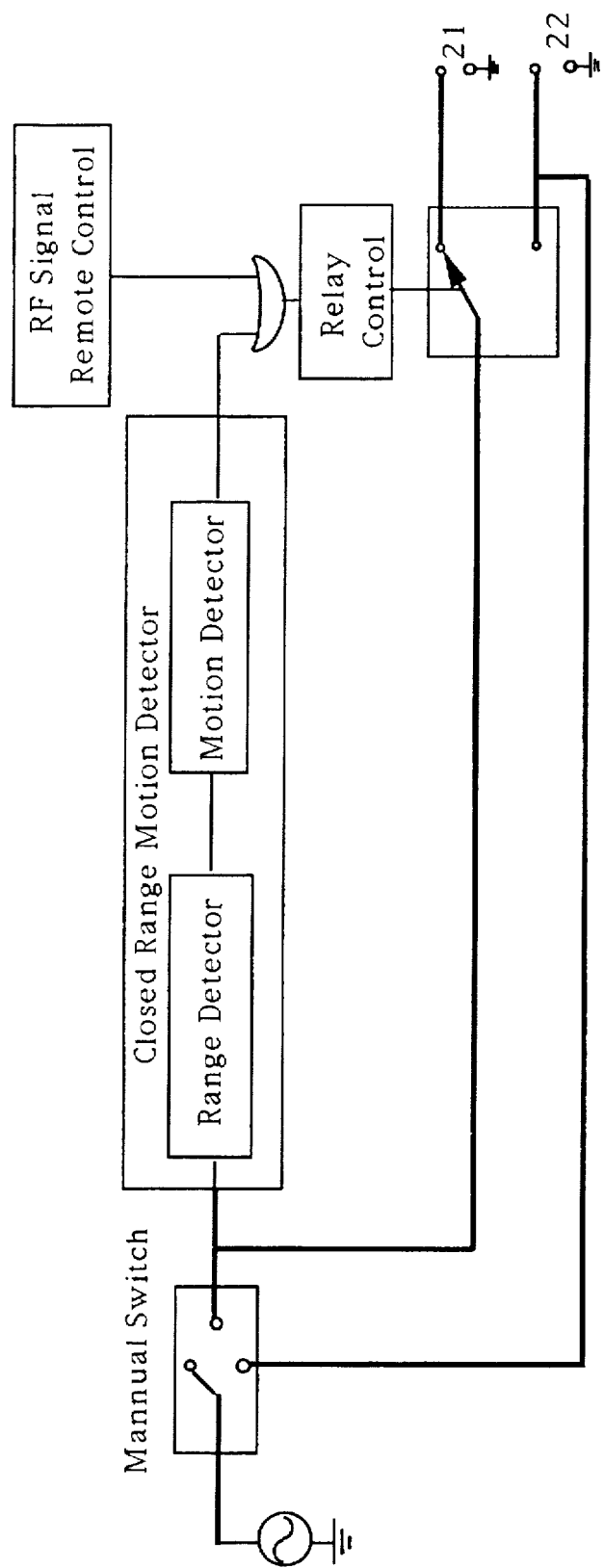
FIG. 14 is the simplified block diagram of the open system programmable smart socket adaptor with the closed range motion detector and the RF signal remote control.

Depending on the versatile functions requested by the customers to add to the smart socket adaptor, the smart socket adaptor can have many different implementations. For example, the smart socket adaptor 1 makes the connections among the conventional consumer electronic products such as a television 5 and a tape recorder 4 to be one intelligent integrated system. FIG. 14 shows the block diagram of the smart socket adaptor I constituting of the motion detector and RF remote control signal receiver. FIG. 15 shows the circuit of the smart socket adaptor with the motion detector 11.

Figure 15A:
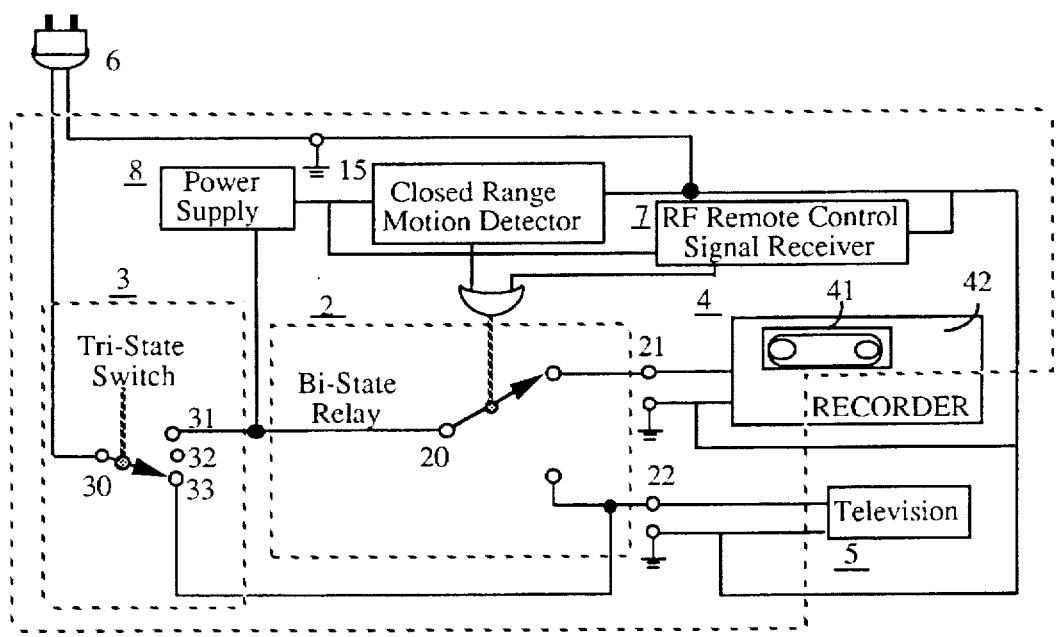
Figure 15B:
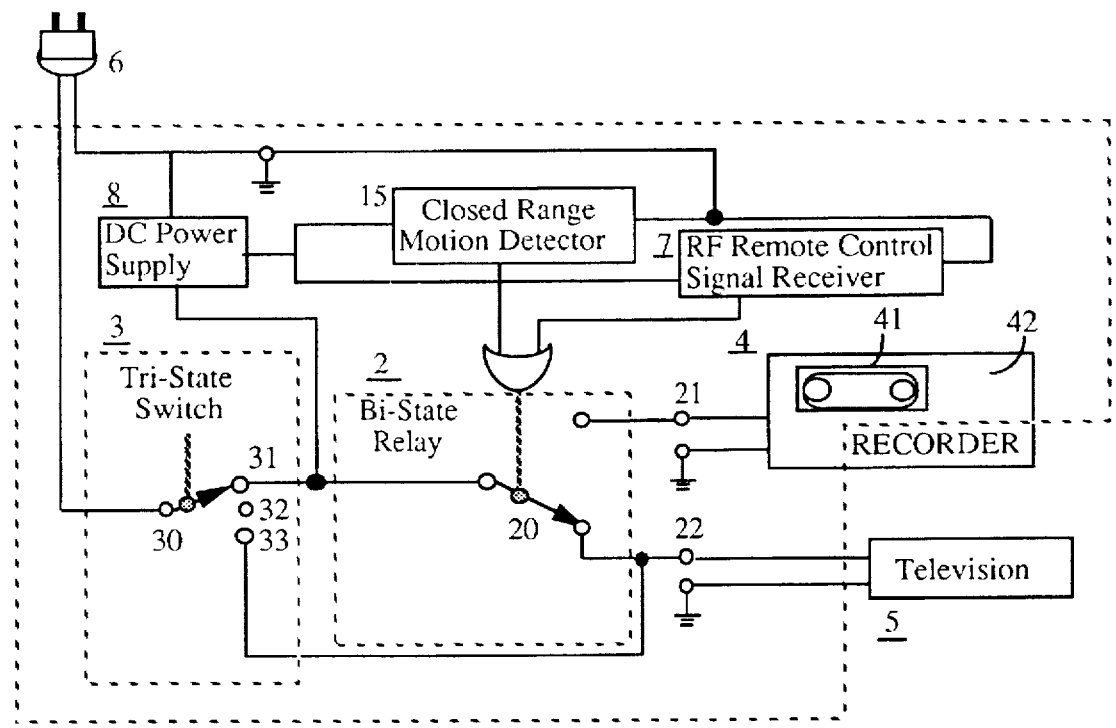
Figure 15C:
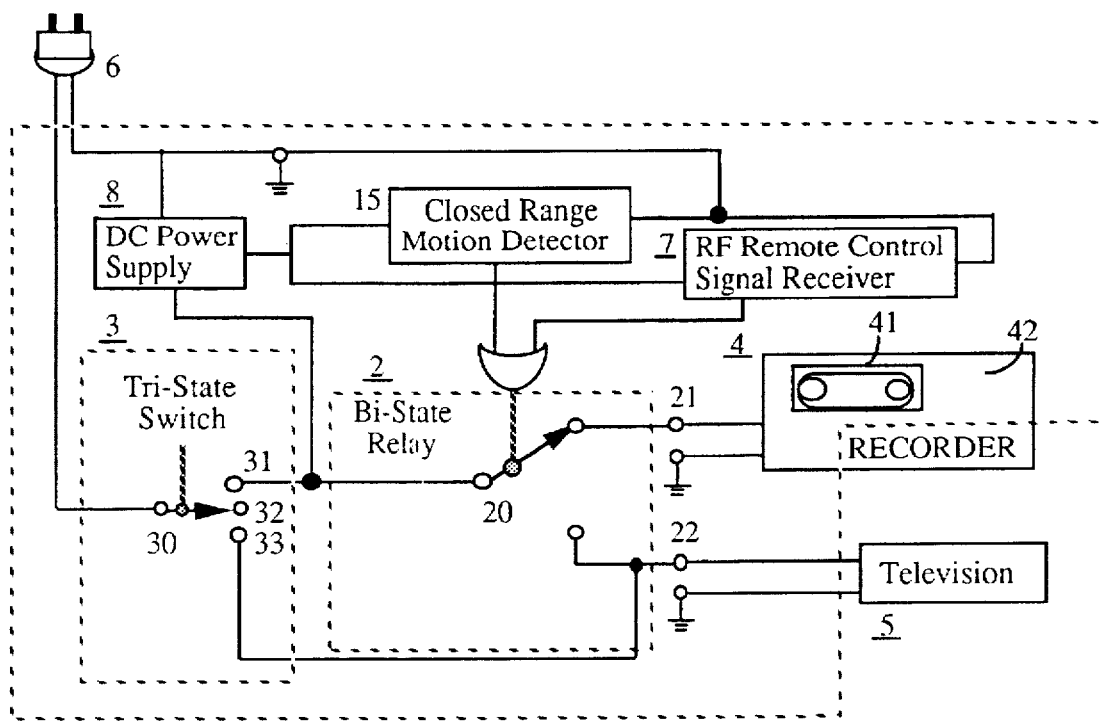

There is a bypass route in the tri-state dimmer switch 3. In the bypass route, the television or the other load such as light bulb are connected the same way as the conventional socket. FIG. 15B is the block diagram of smart socket adaptor 1 in the monitor mode. The DC power supply 8 supplies the 5 volts DC current to all the electronic circuit. The close range motion detector detects the movement of baby in the monitored region. If the monitored region is the TV radiated zone, the close range motion detector sends the signal to the bi-function dimmer relay 2 to turn off the television 5 and power on the recorder 4 to issue the warning messages as shown in FIG. 18C. The bi-function dimmer relay 2 may be also controlled by the remote control 7 to turn on and turn off the bi-function relay switch 2.

Figure 15D:
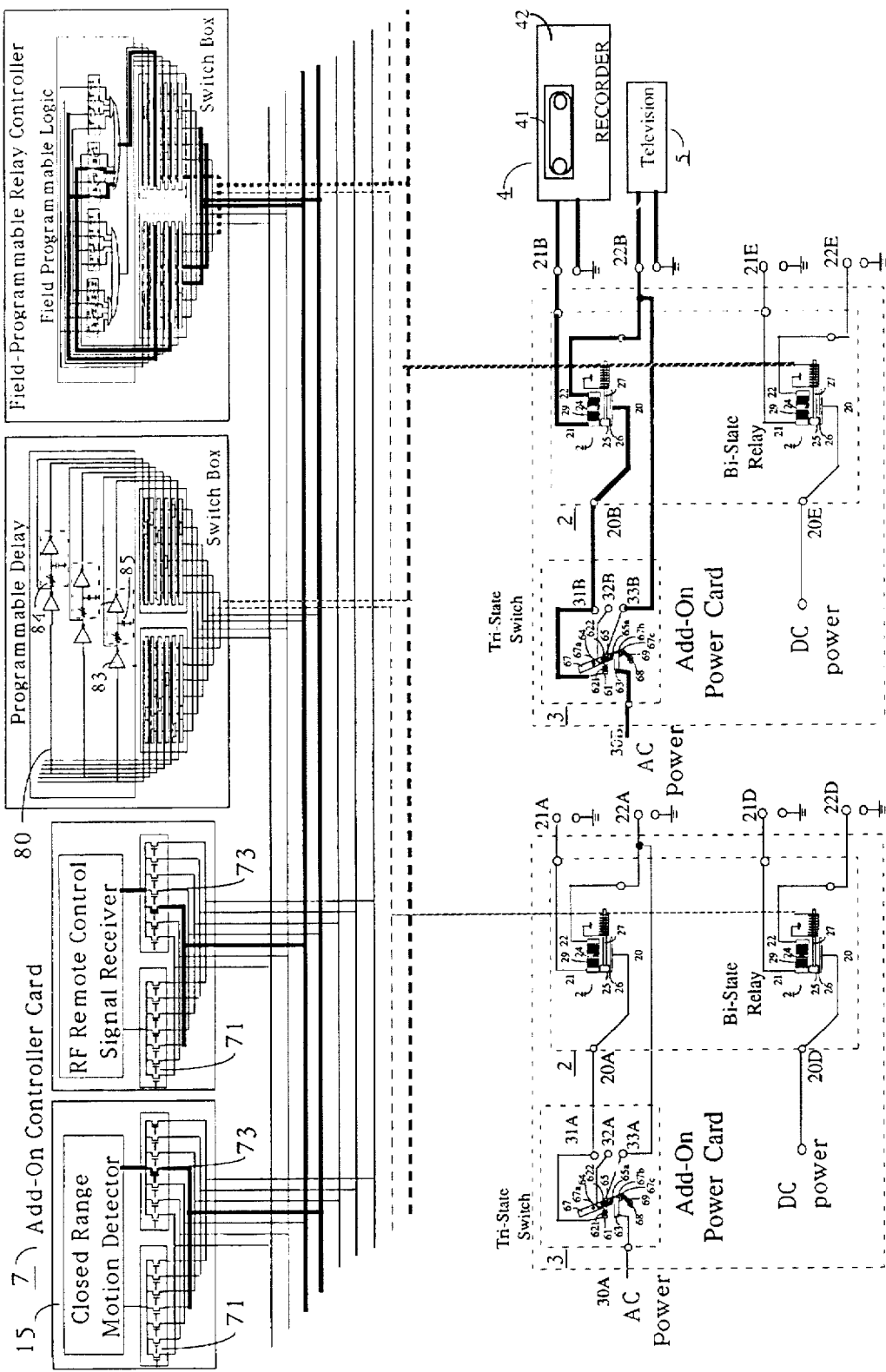

In the by-pass mode, the monitor devices is completely shut down and the television acts as being pluged in the conventional socket. As shown in FIG. 15B, in the monitor mode, the infrared smart socket adaptor will automatically turn on and off the television. As the baby is detected in the monitored region, the smart socket adaptor will automatically turn off the television. As the man walks away and stays outside the monitored region, the smart socket adaptor will automatically turn on the television. There are many applications for the smart socket adaptor 1. If we wish to confine the baby in the monitored region, we just need to switch the plugs in the sockets 21 and 22. FIG. 15D shows the smart socket adaptor in FIG. 15A and FIG. 15B being implemented with the add-on smart socket adaptor as shown in FIG. 2B. The corresponding circuit connections in FIG. 15A and FIG. 15B are marked with the thick lines as shown in FIG. 15D. It shows the practical application of the add-on smart socket adaptor.

FIG. 16 and FIG. 17 show the outside view of the custom-made smart socket adaptor having the infrared motion detector and the other add-on functions. FIG. 16A shows the socket adaptor for the single plug; FIG. 16B shows the socket adaptor for the multiple plugs. FIG. 17A shows the wall-switch type smart socket adaptor; FIG. 17B shows the plug-in type smart socket adaptor to modify the existing socket adaptor to be a smart socket adaptor. FIG. 18 shows the smart socket adaptor with the extension wire connected in series to protect the large electrical facility which has multiple accesses.

FIG. 19 shows the detailed block diagram of the smart socket adaptor having the infrared motion detector. The infrared sensor 111 receives the infrared radiation emitted by the man. The infrared signal is transformed into the electrical signal and sent to the differential circuit 112. As the man moves, the differential circuit will detect the variance of intensity of infrared radiation. The band-pass filter 113 filters out the signal component which corresponds to the human movement. The automatic gain amplifier 16 adjusts the gain to keep the signal at the constant level. The rectifier 17 sets the signal to be positive. If the positive signal 18 is larger than the sensitivity level 19, the comparator 114 sends the on signal to the OR gate 115 to stimulate the timer 116. The timer 116 sends the on signal to stimulate the dimmer relay control 23 and the talking chip 44. The RF remote control signal receiver receives the remote control signal and send the output signal to the OR gate. The RF remote control signal, the mat switch, the timing monitor and the motion detector all can send the signal to activate the relay control 23. The dimmer relay control 23 sends the signal to the bi-vfunction relay 2 to turn off the television 5 or to dim the screen of the television 5 and turn on the warning light and bell 43.

FIG. 20 shows the building blocks for the smart socket adaptor with the ultrasonic close range motion detector 12. The oscillator of frequency synthesizer 120 generates the local oscillatory signal. The local frequency synthesizer may be implemented with the programmer timer 126. It comprises the range selector 71 and the motion detector 72. The range selector 71 generates a pulse 233. The transmission AND gate 130 transmits the local oscillatory signal out. The range selector 71 is implemented with the range controlled pulse generator 71. As shown in FIG. 21, the range controlled pulse generator 71 may be implemented with the astable multivibrator 231 and the monostable multivibrator 232. The close range motion detector 72 comprises the signal frequency filter 128, the auto gain amplifier AG and the rectifier R.

As the baby is detected to be in the close range by the receiver 121, then the close range signal is detected to have the motion signal component by the motion detector 72. To demodulate the doppler effect frequency shift signal, the local oscillating signal generated by the oscillator 120 is fed into the multiplier 124. The resultant signal is fed through the bandpass filter 128, automatic gain amplifier 16, rectifier 17 and comparator 129. The filter 128 filters out the doppler effect frequency shift signal from the reflected signal. The transmission AND gate 130 only allows the reflected signal inside the radiated zone to be passed. The timing gate is implemented with the transmission gates 125. The automatic gain amplifier AG adjusts the gain to keep the doppler shifted signal at the constant level. The rectifier R sets the signal to be positive. The comparator 129 compares the positive signal 18 with the sensitivity level 19. If the positive signal 18 is larger than the senitivity level 19, the comparater 129 sends the "on" signal to the AND gate 130 to stimulate the timer 116. The timer 116 sends the "on" signal to stimulate the dimmer relay 23, talking chip 44. The bi-[state] function relay 23 sends the signal to turn off the electrical facilities or dim the screen of the television 5 and turn on the warning light and bell 43.

FIG. 22 shows the add-on smart socket adaptor 1 equipped with the passive infrared type detector add-on card and the other add-on cards. The facet 111 divides the monitored zone into many small regions. The facet 111 may adjust the tilting angle with the universal joint 112. Its height may be adjusted with the sleeve tube 113. FIG. 22B shows the backside of the passive infrared type smart socket adaptor. The socket 22 is for television plug 222; the socket 21 is the adaptor for the warning message means such as a tape recorder 4. The tri-state switch 3 is to make the alternative choice among the power-on moniter mode 31, turn-off mode 32 and by-pass mode 33 as shown in FIG. 15.

As shown in FIG. 22, the smart socket adaptor 1 is seated on the top of television to monitor the radiated zone before the screen 51 of the television 5. The electric plug 222 of the television 5 is plugged in the smart socket adaptor 1. The plug 6 conducts the AC power to the smart socket adaptor 1 to generate the regulated power. The plug 222 conducts the regulated power to the television 5. The smart socket adaptor 1 detects the motion in the close range radiated zone. The mat switch 13 lies on the floor covering on the radiated zone. Either the mat switch 13 or the close range motion detector of the samrt socket adaptor 1 may work independently.

FIG. 23 is the block diagram of the television monitored with the passive infrared type smart socket adaptor. The de power supply 8 generates the low voltage power supply. To make the figures clear, all the dc power supply lines are omitted in the following figures. The wire 131 conducts the mat switch signal to the smartsocket adaptor means 1. As the close range motion detector 15 and/or the mat switch 13 detect the baby's motion in the radiated zone, the close range motion detector 14 and/or mat switch 13 generate signal to the OR gate 16. The OR gate 16 sends signal to the bi-function dimmer relay 2 to stimulate the warning message generator 333 and dim the TV screen 51 of the television 5. The warning message 333 may be the tape recorder 4, talking chip 44, warning light and bell 43 as shown in FIG. 14.

The smart socket adaptor is a stand alone product to add-on the existing electrical facilities. Since the smart socket adaptor circuit is so concise, the smart socket adaptor may be further integrated with the television with small modifications that the television becomes an intelligent television 9. As shown in FIG. 24, it shows the block diagram of the television monitoring the child with the ultrasonic type baby watcher which has been integrated with the television. The dc power supply 8 supplies the dc current and low voltage to all the electrical signal processing circuit. The transmitter 97 sends the ultrasonic signal out covering the irradiated zone. The receiver 94 receives the reflected ultrasonic signal and transforms this signal into an electrical signal. The electrical signal is sent to the position and motion detect circuit 95. The position and motion detect circuit uses the reflection time of the signal to measure the distance and uses the doppler effect to measure the motion in the radiated zone. As the motion is detected in the radiated zone, the detect circuit 95 sends the turning off signal to the bi-function dimmer relay 2. The turning on signal of mat switch 13 will send the "on" signal to the OR gate 96 to stimulate the bi-function dimmer relay 2 to dim the screen of the cathode ray tube 99.

While present exemplary embodiments of this invention, and methods of practicing the same, have been illustrated and described, it will be recognized that this invention may be otherwise variously embodied and practiced within the scope of the following claims.

What I claim is:

1. A smart socket adaptor comprising a plurality of monitoring means, program logic means, power means, signal bus means, a plurality of power plug means and socket adaptor means, for each of said a plurality of monitor means further comprising detecting device means, signal processing circuit means and drive circuit means to detect changes of environment and send signal through said signal bus means to said program logic means; said detecting device means detecting a change in environment to generate a detected signal, said signal processing circuit processing said detected signal and sending to said drive circuit means, said drive circuit means sending a driving signal on said signal bus means;

said program logic means comprising programmable logic means to process said driving signals coming from said a plurality of monitor means to make combinatory logic decision functions of said signals coming from said a plurality of monitor means and sending output driving signal through said signal bus means again to said power means;

for each of said a plurality of power means comprising switch means and relay means connecting said power plug means with said socket adaptor means, said output driving signal controlling said relay means to supply and interrupt power to said socket adaptor means.

2. A smart socket adaptor means according to claim 1, further comprising programmable delay means, said signal bus means connecting with said programmable delay means and feeding signal to said programmable delay means;

said programmable delay means adding delay to said signals of said signal bus means to generate delayed signals and sending said delayed signal back to said signal bus means.

3. A smart socket adaptor according to claim 2, said programmable delay means further comprising an input switch box means and an output switch box means, said input switch box means and output switch box means connecting said program delay means with said signal bus means, said input switch box means selecting signals to input said program delay means, said output switch box means loading output signal of programmable logic means to selected signal bus means.

4. A smart socket adaptor means according to claim 1, said monitor means further comprising an input multiplex means and output multiplex means, said input multiplex and output multiplex means connecting said monitoring means with said signal bus means, said input multiplex means sending selecting signals to said monitoring means, said output multiplex means loading output signal of monitoring means to selected said signal bus means.

5. A smart socket adaptor according to claim 1, said program logic means further comprising an input switch box means and an output switch box means, said input switch box means and output switch box means connecting said program logic means with said signal bus means, said input switch box means selecting input signal to said program logic means, said output switch box means loading output signal of program logic means to selected said signal bus means.

6. A smart socket adaptor according to claim 1, said power means further comprising a tri-state switch, said tri-state switch connecting a power lead said power plug with an input lead of said relay means, as said tri-state switch being switched off, all the power supplying to said smart socket adaptor been cut off to save energy and extend life of said smart socket adaptor.

7. A smart socket adaptor according to claim 6, wherein said tri-state switch is a dimmer switch comprising a sliding slab, conducting poles, variable resistors, sliding plug and recoil springs, a first recoil spring being installed beneath said sliding slab;

a second and a third recoil springs squeezing against with said first recoil in a sliding motion of said sliding slab to have tri-state toggling action;

said conducting poles connecting with said variable resistors; an isolated block being inserted between said variable resistors;

said sliding plug sliding between said conducting poles, variable resistors and isolated block, said sliding plug having leaf springs mounted on said sliding plug and contacting with said conducting poles and variable resistor.

8. A smart socket adaptor according to claim 1, said relay means is a conjugate bi-function relay, said conjugate bi-state function relay comprising two power leads and one ground lead, as said output driving toggling, one of said power leads being switched on and another power lead being switched off, and vice versa.

9. A smart socket adaptor according to claim 8, wherein said conjugate bi-function relay is a dimmer toggle switch comprising a toggle bar, conducting poles, variable resistors, sliding plug and expanding spring, said toggle bar comprising a slot pivoting at a pin, said sliding plug having a pin sliding inside said slot, said expanding spring being hooked at the end of said toggle bar;

said conducting poles connecting with said variable resistors;

said sliding plug sliding between said conducting poles and variable resistors, said sliding plug having leaf springs mounted on said sliding plug to contact with said conducting poles and variable resistor;

said expanding spring expanding to push said toggle bar and sliding plug to two toggling positions.

10. A smart socket adaptor according to claim 9, further including an isolated block, said isolated block being connected with said variable resistor at one end, said sliding plug sliding from said conducting poles, variable resistors to said isolated block in a toggling action;

as said sliding plug contacting with said conducting poles, said toggle switch conducting current;

as said sliding plug contacting with an isolating poles, said toggle switch being turned off.

11. A smart socket adaptor according to claim 9, further including an isolated block, said isolated block being clamped between a first variable resistor and a second variable resister, said sliding plug sliding from said first conducting pole, first variable resistor and isolated block to the second variable resistor, second conducting pole and vice versa in a toggling action;

as said sliding plug contacting with said conducting poles, said toggle switch conducting current;

as said sliding plug contacting with said conducting poles, said toggle switch being turned off.

12. A smart socket adaptor according to claim 8, wherein said conjugate bi-function relay is a dimmer relay comprising a coil, conducting poles, variable resistors and a magnetic sliding plug.

said conducting poles connecting with said variable resistors;

said magnetic sliding plug sliding between said conducting poles and variable resistors, said sliding plug having leaf springs mounted on said sliding plug and contacting with said conducting poles and variable resistor;

as electrical current in said coil changing directions, said magnetic sliding plug changing sliding directions.

13. A smart socket adaptor according to claim 1, of which said detecting device means comprising a close range motion detector, said power plug means comprising a tri-state switch and a conjugate bi-function relay, said socket adaptor means comprising a first regulated power socket and an AC power supply, a power plug of a first electronic facility being inserted in said first regulated power socket, said tri-state switch comprising an AC power lead, bypass lead, open circuit lead and a monitor lead, said monitor lead connecting to a power lead of said AC power, said bypass lead connecting to a lead of said first regulated power socket, said tri-state switch being connected to a power lead said AC power supply and operating in a three-mode operation with: (1) said bypass lead to connect the AC power supply directly to said first electronic facility via said first regulated power socket, (2) said open circuit lead to disconnect the AC power supply completely and (3) said monitor lead to connect the AC power supply to said conjugate bi-function relay, as said tri-state switch being switched off, all the power supplying to said smart socket adaptor been cut off to save energy and extend life of said smart socket adaptor, said conjugate bi-function relay making an electrical connection between the monitor lead of said tri-state switch and said first regulated power socket with a first lead of said bi-state relay, said conjugate bi-state function relay comprising two power leads and one ground lead, as said output driving signal toggling, one of said power terminal being switched on and another power terminal being switched off, and vice versa, said close range motion detector detects a movement inside a monitored zone and stimulates said conjugate bi-function to switch on or switch off the electrical connection between said first regulated power socket and the monitor lead of said tri-state switch.

14. A smart socket adaptor according to claim 8 further including a second socket means, said second socket means being for a power plug of a second electronic facility to be inserted in, said second socket means share the same conjugate bi-function relay with said first regulated power socket to be a second regulated power socket means;

said conjugate bi-function relay making an electrical connection between said second regulated power socket and a monitor lead of said tri-state switch with a second lead of said conjugate bi-function relay;

said close range motion detector detecting a movement inside a monitored zone and stimulating said conjugate bi-function relay to switch an electrical connection from said first lead to said second lead and as said close range motion detector not detecting a movement inside a monitored zone and stimulating said conjugate bi-function relay to switch an electrical connection from said second lead to said first lead.

15. A smart socket adaptor according to claim 13, wherein said close range motion detector comprises a transmitter, a receiver, a range detector and a motion detector, said transmitter emitting transmitting wave outside, said receiver receiving reflected wave, said range detector detecting said reflected wave in a prescribed time period after the emitting of said transmitting wave, said motion detector detecting the doppler effect frequency shift in said reflected wave.

16. A smart socket adaptor according to claim 15, wherein said transmitting wave is an ultrasonic wave.

17. A smart socket adaptor according to claim 13, wherein said close range motion detector comprises a receiver, a range detector and a motion detector, said receiver receiving infrared wave, said range detector detecting said infrared wave in a prescribed monitoring zone, said motion detector detecting the motion in said infrared wave.

18. A smart socket adaptor according to claim 13, wherein said close range motion detector is a mat switch, said mat switch being a foam clamped between two metal plates;

under a body weight, said two metal plates contacting with each other to conduct an electrical current and said mat switch being closed, as said body weight being removed, said foam expanding to open said mat switch.

19. A smart socket adaptor according to claim 13, further including a remote control means, said remote control means receiving a remote control signal to switch said conjugate bi-function relay to connect or disconnect an electrical connection between said first regulated power socket and said tri-state switch.

20. A smart socket adaptor according to claim 1 of which said monitor means comprising a close range motion detector, said power plug means comprising a conjugate bi-function relay and a tri-state switch, said socket adaptor means comprising a first regulated power socket and an AC power supply to supply power to a television, said tri-state switch comprising AC power lead, bypass lead, open circuit lead and a monitor lead, said monitor lead connecting to a power lead of said AC power, said bypass lead connecting to a lead of said first regulated power socket, said tri-state switch being connected to said power lead said AC power supply and operating in a three-mode operation with: (1) said bypass lead to connect the AC power supply directly to said first electronic facility via said first regulated power socket, (2) said open circuit lead to disconnect the AC power supply completely and (3) said monitor lead to connect the AC power supply to said bi-function relay, as said tri-state switch being switched off, all the power supplying to said smart socket adaptor been cut off to save energy and extend life of said smart socket adaptor, said television having a power plug being inserted in said first regulated power socket, said conjugate bi-function relay making a first electrical connection between said first regulated power socket and said tri-state switch with a first lead of said relay; said conjugate bi-state function relay comprising two power leads and one ground lead, as said output driving toggling, one of said power terminal being switched on and another power terminal being switched off, and vice versa;

said closed range motion detector detecting a movement inside a monitored zone and stimulating said conjugate bi-function relay to switch on or switch off the electrical connection between said AC power power supply and said television.

21. A smart socket adaptor according to claim 20, further includes a second regulated power socket, said second regulated power socket being just a standard socket sharing the same conjugate bi-function realy with said first regulated power socket, said second regulated power socket being for a power plug of an electronic facility to be inserted in, said bi-function relay making a second electrical connection between said second regulated power socket and said tri-state switch with a second lead of said conjugate bi-function relay;

said close range motion detector detecting a movement inside a monitored zone and stimulating said conjugate bi-function relay to switch an electrical connection from said first regulated power socket to said second regulated power socket and vice versa.

22. A smart socket adaptor according to claim 21, wherein said electronic facility is an endless tape cassette comprising a tape, hubs and poles, said tape having an endless loop wrapped on hubs and poles.

23. A smart socket adaptor comprising a plurality of monitoring means, program logic means, power means, signal bus means, a plurality of power plug means and socket adaptor means, for each of said a plurality of monitor means further comprising detecting device means, signal processing circuit means and drive circuit means to detect changes of environment and send signal through said signal bus means to said program logic means; said detecting device means detecting a change in environment to generate a detected signal, said signal processing circuit processing said detected signal and sending to said drive circuit means, said drive circuit means sending a driving signal on said signal bus means;

said program logic means comprising programmable logic means to process said driving signals coming from said a plurality of monitor means to make the combinatory logic decisions of said signals coming from said a plurality of monitor means and sending output driving signal through said signal bus means again to said power means;

for each of said a plurality of power means comprising switch means and relay means connecting said power plug means with said socket adaptor means, said output driving signal controlling said relay means to supply and interrupt power to said socket adaptor means;

said power means further comprising a tri-state switch, said tri-state switch connecting a power lead of said power plug with an input lead of said relay means, as said tri-state switch being switched off, all the power supplying to said smart socket adaptor been cut off to save energy and extend life of said smart socket adaptor;

said tri-state switch being a dimmer switch comprising a sliding slab, conducting poles, variable resistors, sliding plug and recoil springs, a first recoil spring being installed beneath said sliding slab;

a second and a third recoil springs squeezing against with said first recoil in a sliding motion of said sliding slab to have tri-state toggling action;

said conducting poles connecting with said variable resistors; an isolated block being inserted between said variable resistors;

said sliding plug sliding between said conducting poles, variable resistors and isolated block, said sliding plug having leaf springs mounted on said sliding plug and contacting with said conducting poles and variable resistor.

24. A smart socket adaptor comprising a plurality of monitoring means, program logic means, power means, signal bus means, a plurality of power plug means and socket adaptor means, for each of said a plurality of monitor means further comprising detecting device means, signal processing circuit means and drive circuit means to detect changes of environment and send signal through said signal bus means to said program logic means; said detecting device means detecting a change in environment to generate a detected signal, said signal processing circuit processing said detected signal and sending to said drive circuit means, said drive circuit means sending a driving signal on said signal bus means;

said program logic means comprising programmable logic means to process said driving signals coming from said a plurality of monitor means to make the combinatory logic decisions of said signals coming from said a plurality of monitor means and sending output driving signal through said signal bus means to said power means;

for each of said a plurality of power means comprising switch means and relay means connecting said power plug means with said socket adaptor means, said output driving signal controlling said relay means to supply and interrupt power to said socket adaptor means;

said relay means being a conjugate bi-function relay, said conjugate bi-function relay comprising two power terminals and one ground terminal, as said output driving toggling, one of said power terminal being switched on and another power terminal being switched off, and vice versa;

said conjugate bi-function relay being a dimmer relay comprising a coil, conducting poles, variable resistors and a magnetic sliding plug, said conducting poles connecting with said variable resistors;

said magnetic sliding plug sliding between said conducting poles and variable resistors, said sliding plug having leaf springs mounted on said sliding plug and contacting with said conducting poles and variable resistor;

as electrical current in said coil changing directions, said magnetic sliding plug changing sliding directions.

25. A smart socket adaptor comprises a plurality of monitoring means, program logic means, power means, signal bus means, a plurality of power plug means and socket adaptor means, for each of said a plurality of monitor means comprising detecting device means, signal processing circuit means and drive circuit means to detect changes of environment and send signal through said signal bus means to said program logic means; said detecting device means detecting a change in environment to generate a detected signal, said signal processing circuit processing said detected signal and sending to said drive circuit means, said drive circuit means sending a driving signal on said signal bus means;

said program logic means comprising programmable logic means to process said driving signals coming from said a plurality of monitor means to make the combinatory logic decisions of said signals coming from said a plurality of monitor means and sending output driving signal through said signal bus means to said power means;

for each of said a plurality of power means comprising switch means and relay means connecting said power plug means with said socket adaptor means, said output driving signal controlling said relay means to supply and interrupt power to said socket adaptor means;

said relay means being a conjugate bi-function relay, said conjugate bi-function relay comprising two power terminals and one ground terminal, as said output driving toggling, one of said power terminal being switched on and another power terminal being switched off, and vice versa;

said conjugate bi-function relay being a dimmer toggle switch comprising a toggle bar, conducting poles, variable resistors, sliding plug and expanding spring, said toggle bar comprising a slot pivoting at a pin, said sliding plug having a pin sliding inside said slot, said expanding spring being hooked at the end of said toggle bar;

said conducting poles connecting with said variable resistors;

said sliding plug sliding between said conducting poles and variable resistors, said sliding plug having leaf springs mounted on said sliding plug to contact with said conducting poles and variable resistor;

said expanding spring expanding to push said toggle bar and sliding plug to two toggling positions.

26. A smart socket adaptor according to claim 25, further includes an isolated block.

said isolated block being connected with said variable resistor at one end, said sliding plug sliding from said conducting poles, variable resistors to said isolated block in a toggling action;

as said sliding plug contacting with said conducting poles, said toggle switch conducting current;

as said sliding plug contacting with an isolating poles, said toggle switch being turned off.

27. A smart socket adaptor according to claim 25, further includes an isolated block.

said isolated block being clamped between a first variable resistor and a second variable resister, said sliding plug sliding from said first conducting pole, first variable resistor and isolated block to the second variable resistor, second conducting pole and vice versa in a toggling action;

as said sliding plug contacting with said conducting poles, said toggle switch conducting current;

as said sliding plug contacting with said conducting poles, said toggle switch being turned off.

* * * * *